United States Patent
Chang et al.

(10) Patent No.: US 12,248,052 B2
(45) Date of Patent: Mar. 11, 2025

(54) DOPPLER RADAR APPARATUS AND POWER SAVING METHOD THEREOF

(71) Applicant: Wistron Corporation, New Taipei (TW)

(72) Inventors: Yao-Tsung Chang, New Taipei (TW); Yin-Yu Chen, New Taipei (TW); Chuan-Yen Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 382 days.

(21) Appl. No.: 17/521,865

(22) Filed: Nov. 9, 2021

(65) Prior Publication Data

US 2023/0104935 A1 Apr. 6, 2023

(30) Foreign Application Priority Data

Oct. 1, 2021 (TW) ................. 110136709

(51) Int. Cl.
*G01S 13/32* (2006.01)
*G01S 7/02* (2006.01)
*G01S 7/35* (2006.01)

(52) U.S. Cl.
CPC ............ *G01S 13/32* (2013.01); *G01S 7/02* (2013.01)

(58) Field of Classification Search
CPC ... G01S 13/32; G01S 7/02; G01S 7/35; G01S 7/415; G01S 13/4454; G01S 13/584; G01S 13/343; Y02D 30/70
USPC ........................................................ 342/128
See application file for complete search history.

(56) References Cited

U.S. PATENT DOCUMENTS

| 10,630,249 | B2 | 4/2020 | Rao et al. | |
| 2019/0044485 | A1 | 2/2019 | Rao et al. | |
| 2019/0056476 | A1* | 2/2019 | Lin | G01S 7/021 |
| 2020/0321928 | A1* | 10/2020 | Rao | G01S 13/931 |
| 2021/0190902 | A1* | 6/2021 | Amihood | G01S 7/358 |
| 2022/0260709 | A1* | 8/2022 | Lee | H04W 52/02 |

FOREIGN PATENT DOCUMENTS

CN 110945376 3/2020

OTHER PUBLICATIONS

"Search Report of Europe Counterpart Application", issued on May 25, 2022, p. 1-p. 10.
"Office Action of Taiwan Counterpart Application", issued on Aug. 3, 2022, p. 1-p. 8.

* cited by examiner

*Primary Examiner* — Vladimir Magloire
*Assistant Examiner* — Remash R Guyah
(74) *Attorney, Agent, or Firm* — JCIPRNET (57) ABSTRACT

A Doppler radar apparatus, including a transmitter, a receiver, and a processor, is provided. The transmitter transmits a radio frequency signal to a field. The receiver is coupled to the transmitter and receives a reflected signal corresponding to the radio frequency signal from the field. The processor is coupled to the receiver and is configured to detect a target in the field according to the reflected signal. In response to the target not being detected in the field, the processor switches to a power saving mode according to workload reduction information, and workload of the radio frequency signal in the power saving mode decreases based on the workload reduction information.

19 Claims, 10 Drawing Sheets

DOPPLER RADAR APPARATUS AND POWER SAVING METHOD THEREOF

CROSS-REFERENCE TO RELATED APPLICATION

This application claims the priority benefit of Taiwan application serial no. 110136709, filed on Oct. 1, 2021. The entirety of the above-mentioned patent application is hereby incorporated by reference herein and made a part of this specification.

BACKGROUND

Technical Field

The disclosure relates to a radar technology, and particularly relates to a Doppler radar apparatus and a power saving method thereof.

Description of Related Art

Radar technology has been widely applied after years of development, such as aviation radar, car detection radar, and vital sign detection radar. During the detection process, the radar needs to work continuously in order to detect the movement of an object in the environment or vital signs (such as breathing and heartbeat) at any time. The radar continuously emits radio waves, continuously receives reflected radio waves, and continuously processes received data. However, when the radar works continuously under normal conditions, the radar continuously emits radio waves, receives radio waves, and processes data, such that the operation of corresponding circuits in the radar apparatus consumes power continuously, which causes great power consumption.

SUMMARY

The disclosure provides a Doppler radar apparatus and a power saving method thereof, which can save power consumption of a radar apparatus.

An embodiment of the disclosure provides a Doppler radar apparatus, which includes a transmitter, a receiver, and a processor. The transmitter transmits a radio frequency signal to a field. The receiver is coupled to the transmitter and receives a reflected signal corresponding to the radio frequency signal from the field. The processor is coupled to the receiver and is configured to detect a target in the field according to the reflected signal. In response to the target not being detected in the field, the processor switches to a power saving mode according to workload reduction information, and workload of the radio frequency signal in the power saving mode decreases based on the workload reduction information.

An embodiment of the disclosure provides a power saving method applicable to a Doppler radar apparatus, which includes the following steps. A radio frequency signal is transmitted to a field. A reflected signal corresponding to the radio frequency signal is received from the field. A target in the field is detected according to the reflected signal. In response to the target not being detected in the field, the processor switches to a power saving mode according to workload reduction information, and workload of the radio frequency signal in the power saving mode decreases based on the workload reduction information.

Based on the above, according to the Doppler radar apparatus and the power saving method provided by the embodiments of the disclosure, when the radar apparatus does not detect the target in the field, the radar apparatus enters the power saving mode that maintains low power consumption, and the workload of multiple frames in the power saving mode may decrease based on the workload reduction information. In this way, power consumption of the radar apparatus can be saved while taking into account the requirements of normal detection work of the radar apparatus.

DETAILED DESCRIPTION OF DISCLOSED EMBODIMENTS

Some embodiments of the disclosure will be described in detail below in conjunction with the accompanying drawings. The reference numerals cited in the following description will be regarded as referring to the same or similar elements when the same reference numerals appear in different drawings. The embodiments are only a part of the disclosure and do not disclose all the possible implementation manners of the disclosure. To be more precise, the embodiments are only examples of the apparatuses and methods in the claims of the disclosure. Wherever possible, elements/components/steps that use the same reference numerals in the drawings and embodiments represent the same or similar parts. For elements/components/steps that use the same reference numerals or the same terms in different embodiments, related descriptions may be cross-referenced.

Figure 1:
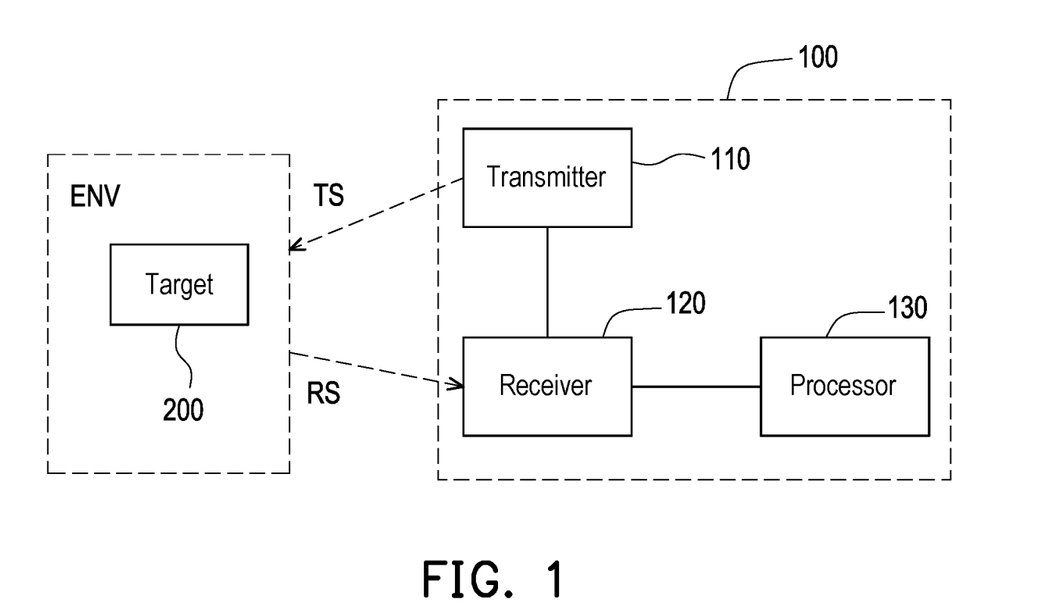
FIG. 1 is a schematic diagram of a radar apparatus according to a first embodiment of the disclosure.

FIG. 1 is a schematic diagram of a radar apparatus according to an embodiment of the disclosure. Please refer to FIG. 1. A radar apparatus 100 includes a transmitter 110, a receiver 120, and a processor 130. The radar apparatus 100 may be, for example, a pulse radar, a continuous wave (CW) radar, a Doppler radar, or a frequency modulated continuous wave (FMCW) radar, and may be applied to fields such as meteorology, speed measurement, topography, military, or physiological detection.

The transmitter 110 transmits a radio frequency signal TS to a field ENV. The receiver 120 is coupled to the transmitter 110. The receiver 120 receives a reflected signal RS corresponding to the radio frequency signal TS from the field ENV. The processor 130 is coupled to the receiver 120. The processor 130 may be configured to detect a target 200 in the field ENV according to the reflected signal RS. In response to the target 200 not being detected in the field ENV, the processor switches to a power saving mode according to workload reduction information.

Figure 2:
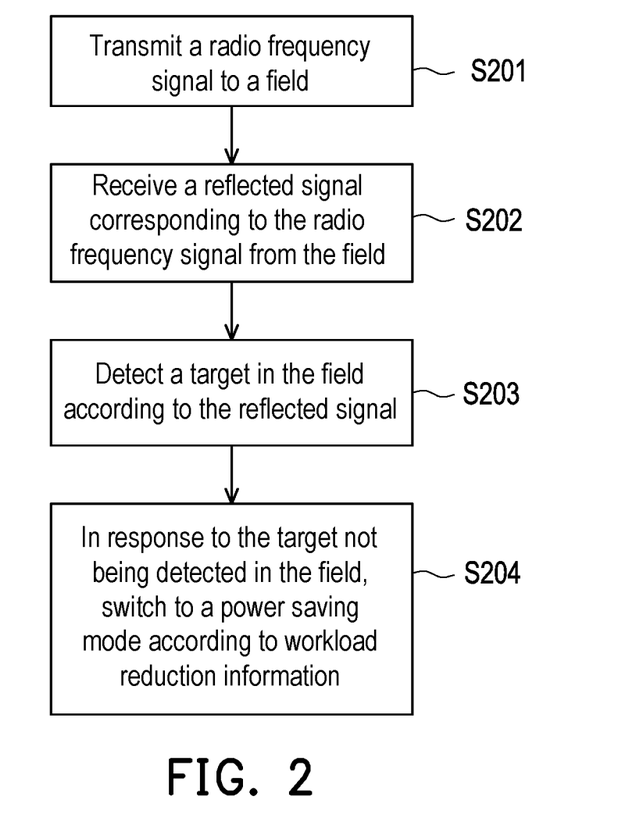
FIG. 2 is a flowchart of a power saving method according to the first embodiment of the disclosure.

FIG. 2 is a flowchart of a power saving method according to the first embodiment of the disclosure. The power saving method in FIG. 2 is applicable to the radar apparatus 100 shown in FIG. 1. Please refer to FIG. 1 and FIG. 2 together below. In Step S201, the transmitter 110 transmits the radio frequency signal TS to the field ENV. In Step S202, the receiver 120 receives the reflected signal RS corresponding to the radio frequency signal TS from the field ENV. In Step S203, the processor 130 detects the target 200 in the field ENV according to the reflected signal RS. In Step S204, in response to the target 200 not being detected in the field ENV, the processor 130 switches to the power saving mode according to the workload reduction information.

In an embodiment, the radar apparatus 100 may be a CW radar. In an embodiment, the radar apparatus 100 may be a Doppler radar. It should be noted that in the power saving mode, workload of the radio frequency signal TS may decrease based on the workload reduction information.

In an embodiment, the radar apparatus 100 may be an FMCW radar. The radio frequency signal TS may include multiple frames, and workload (duty) of the frames in the power saving mode decreases based on the workload reduction information.

Specifically, in a normal working mode of the radar apparatus 100, the transmitter 110 continuously transmits the radio frequency signal TS to detect whether there is the target 200 in the field ENV. The radio frequency signal TS generates the reflected signal RS after being reflected by the target 200 or the environment of the field ENV. For example, the target 200 may be a human body, a stationary environment, or a moving object. The reflected signal RS may be a signal reflected when the radio frequency signal TS hits the human body, the stationary environment, or the moving object. The main frequency of the reflected signal RS is the same as the radio frequency signal TS, and the reflected signal RS is coupled with the speed of the moving object, the phase change generated by breathing or heartbeat of the human body, or the modulation frequency difference generated by the distance between the target 200 and the radar apparatus 100. The processor 130 computes digital data converted from the reflected signal RS. The radar apparatus 100 may detect the target 200 in the field ENV according to the result of computing the digital data, for example, the distance, the direction angle, and the speed of the object to be detected. If the object is the human body, the target 200 may also be vital signs such as breathing and heartbeat of the human body.

The workload of the radar apparatus 100 may be associated with the number of frames corresponding to the radio frequency signal TS, the number of detection signals emitted in each of the frames, or the working time of the radar apparatus 100 for detection. The radar apparatus 100 can reduce power consumption in the power saving mode according to the various manners above. Therefore, the workload reduction information may include the total number of frames, the number of detection signals emitted in each frame, the frequency of the emitted detection signal, or the working time of the radar apparatus 100 for detection. When the radar apparatus 100 enters the power saving mode, the transmitter 110, the receiver 120, or the processor 130 may adjust the workload according to the workload reduction information.

In an embodiment, the radio frequency signal TS corresponds to multiple frames. A first frame of the frames includes multiple first detection signals. A second frame of the frames include multiple second detection signals. After the radar apparatus 100 enters the power saving mode, the number of second detection signals is less than or equal to the number of first detection signals.

In an embodiment, a third frame of the frames includes multiple third detection signals. The processor 130 may capture a fourth detection signal from the third detection signals, and detect the target in the field according to the fourth detection signal.

In an embodiment, the workload reduction information includes the waiting time. The processor 130 may instruct the transmitter 110 to stop transmitting the radio frequency signal TS within the waiting time after switching to the power saving mode.

In an embodiment, the workload reduction information includes the total number of frames corresponding to the radio frequency signal TS. The processor 130 may adjust the number of frames according to the workload reduction information.

In an embodiment, in response to the target 200 being detected in the field ENV, the processor 130 may switch from the power saving mode to the normal working mode, and restore the workload of the frames in the normal working mode.

Figure 3:
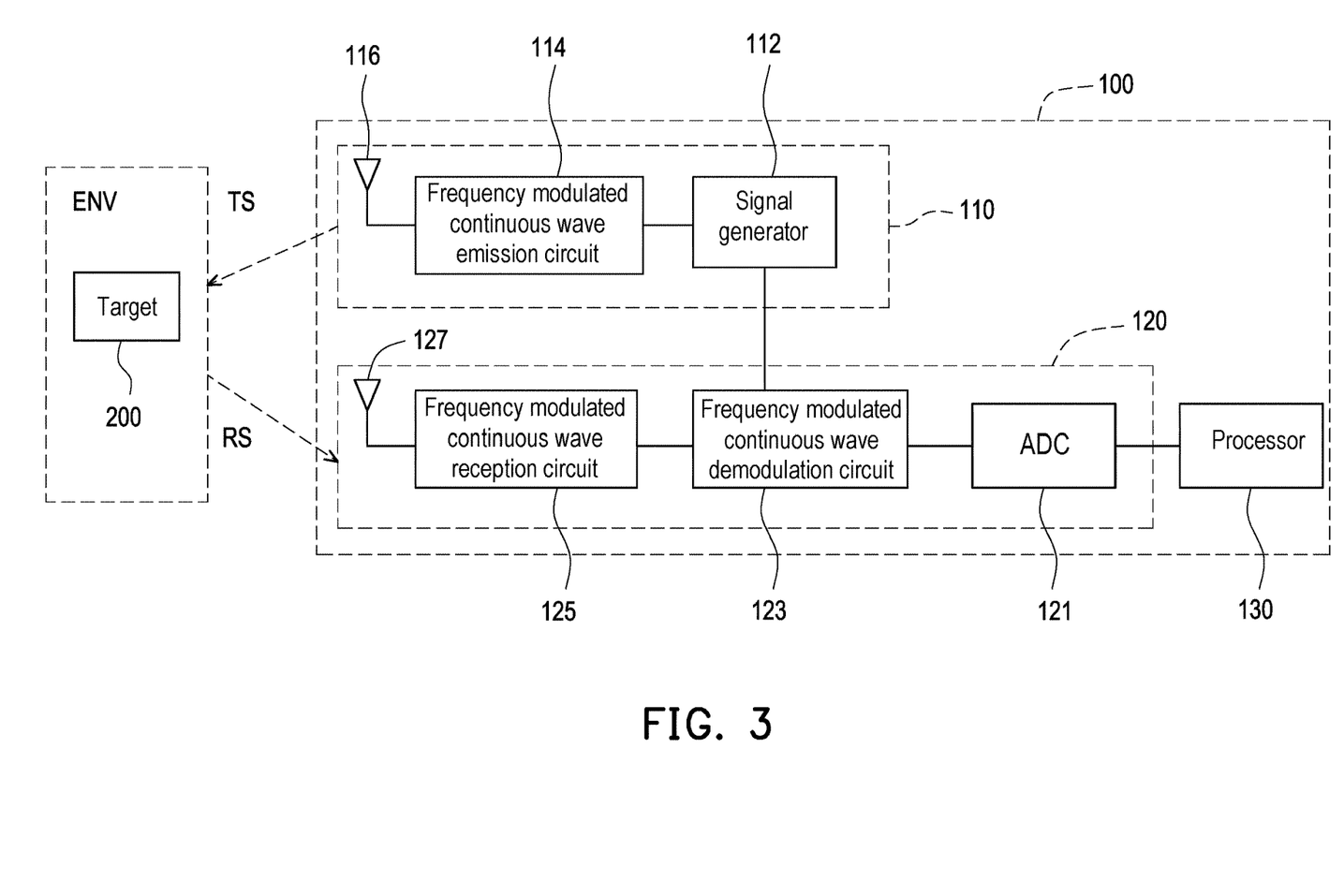
FIG. 3 is a schematic diagram of a radar apparatus according to a second embodiment of the disclosure.

FIG. 3 is a schematic diagram of a radar apparatus according to a second embodiment of the disclosure. In the second embodiment of the disclosure, the radar apparatus 100 is an FMCW radar. Please refer to FIG. 3. The transmitter 110 may include a signal generator 112, a frequency modulated continuous wave emission circuit 114, and an emission antenna 116. The frequency modulated continuous wave emission circuit 114 is coupled to the signal generator 112. The emission antenna 116 is coupled to the frequency modulated continuous wave emission circuit 114. The receiver 120 may include an analog-to-digital converter (ADC) 121, a frequency modulated continuous wave demodulation circuit 123, a frequency modulated continuous wave reception circuit 125, and a reception antenna 127. The frequency modulated continuous wave demodulation circuit 123 is coupled to the signal generator 112. The analog-to-digital converter 121 is coupled to the frequency modulated continuous wave demodulation circuit 123. The frequency modulated continuous wave reception circuit 125 is coupled to the reception antenna 127 and the frequency modulated continuous wave demodulation circuit 123.

The signal generator 112 may generate a chirp signal according to a sweep cycle. The frequency of the chirp signal changes with time during the sweep cycle. The chirp signal may also be referred to as the detection signal. When the radar apparatus 100 performs detection, at least one chirp signal may be included in the frame to detect the target 200.

Figure 4:
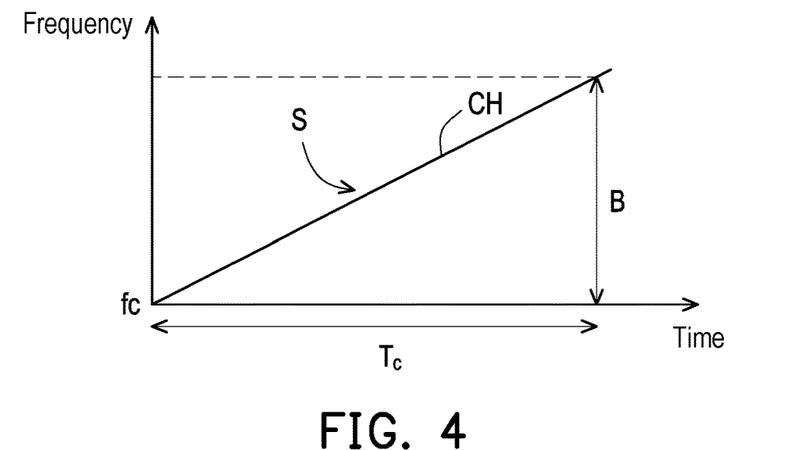
FIG. 4 is a schematic diagram of a chirp signal according to an embodiment of the disclosure.

FIG. 4 is a schematic diagram of a chirp signal according to an embodiment of the disclosure. In an embodiment, a chirp signal CH may be a linear modulation frequency signal. The frequency of the chirp signal CH changes with time from a starting frequency fc to an end frequency (fc+B) during a sweep cycle Tc. The frequency difference between the end frequency (fc+B) and the starting frequency fc is a bandwidth B. In the example shown in FIG. 4, the waveform of the frequency of the chirp signal CH changing with time is a sawtooth wave whose frequency linearly and progressively increases according to a slope S. The general oscillation frequency may be 24 GHz or 77 GHz. For example, in an embodiment, the parameter settings of the frequency variation waveform of the chirp signal CH may be that the starting frequency fc is 77 GHz, the end frequency (fc+B) is 81 GHz, the bandwidth B is 4 GHz, the sweep cycle Tc is 40 us, and the linearly and progressively increasing slope S is 100 MHz/us.

In some embodiments, the waveform of the frequency of the chirp signal CH changing with time may also be a triangular wave that first linearly and progressively increases and then linearly and progressively decreases. In other embodiments, the frequency of the chirp signal CH changing with time may be a non-linear waveform.

Return to the radar apparatus 100 of FIG. 3. The frequency modulated continuous wave emission circuit 114 may include a power amplifier (PA). The frequency modulated continuous wave emission circuit 114 may amplify the chirp signal CH generated by the signal generator 112 to generate the radio frequency signal TS, and emit the radio frequency signal TS through the emission antenna 116. The effective field of view (FOV) of the emission of the radio frequency signal TS may be determined by the emission antenna 116. The design of the emission antenna 116 may be related to the frequency and the emission angle of the radio frequency signal TS. In some embodiments, the frequency modulated continuous wave emission circuit 114 may be coupled to multiple sets of antennas to emit the chirp signal CH at a certain time and emit another chirp signal CH at another time by time domain multiplexing.

The emission antenna 116 may be a patch antenna, a lens antenna, a microstrip antenna, or a waveguide leaky-wave antenna. The emission antenna 116 may emit the radio frequency signal TS. The emission antenna 116 may be implemented using a printed circuit board.

The reception antenna 127 may receive the reflected signal RS. Specifically, the reception antenna 127 may receive the reflected signal RS generated by the radio frequency signal TS reflected by the target 200 or the field ENV. The design of the reception antenna 127 needs to consider the frequency of the radio frequency signal TS. The FOV of the reflected signal RS received by the reception antenna 127 may contain several beams to receive echoes with different direction angles of an object, so as to judge the direction of the object. The reception antenna 127 may be a patch antenna, a lens antenna, a microstrip antenna, or a waveguide leaky-wave antenna. The reception antenna 127 may be implemented using a printed circuit board. In some embodiments, the radar apparatus 100 may adopt a multiple-input-multiple-output (MIMO) architecture.

The frequency modulated continuous wave reception circuit 125 may include front-end signal amplification and filtering. The frequency modulated continuous wave reception circuit 125 may amplify the reflected signal RS and filter the noise of the reflected signal RS. For example, the frequency modulated continuous wave reception circuit 125 first amplifies the tiny reflected signal RS received by the reception antenna 127 by a low-noise amplifier (LNA), and then filters the noise via a filter circuit.

The frequency modulated continuous wave demodulation circuit 123 may demodulate the reflected signal RS according to the chirp signal CH to obtain an intermediate frequency signal. Specifically, the signal generator 112 feeds the generated chirp signal CH back to the frequency modulated continuous wave demodulation circuit 123. Then, the frequency modulated continuous wave demodulation circuit 123 may couple the chirp signal CH and the reflected signal RS through a mixer, and pass the coupled signal through a low-pass filter (LPF) to obtain the intermediate frequency signal.

Figure 5:
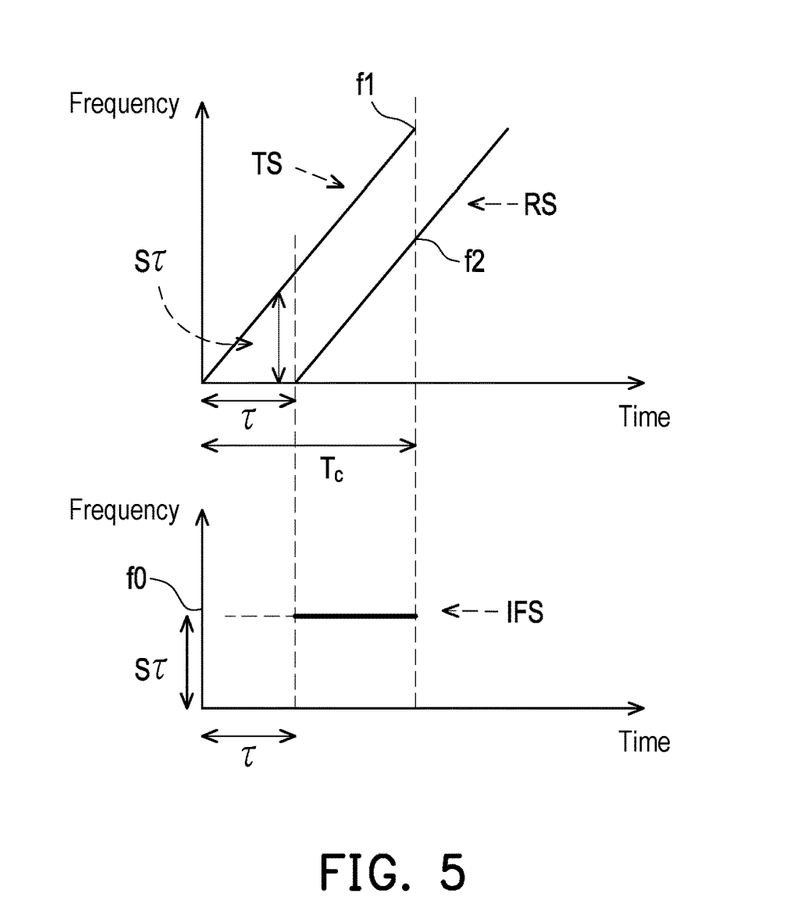
FIG. 5 is a schematic diagram of obtaining an intermediate frequency signal from a radio frequency signal and a reflected signal according to an embodiment of the disclosure.

FIG. 5 is a schematic diagram of obtaining an intermediate frequency signal from a radio frequency signal and a reflected signal according to an embodiment of the disclosure. Please refer to FIG. 5. During the sweep cycle Tc, there is a delay τ between the radio frequency signal TS and the reflected signal RS after being reflected. Due to the delay τ, there is a modulation frequency difference between the radio frequency signal TS and the reflected signal RS at the same time point. The modulation frequency difference ST may be calculated by multiplying the slope S by the delay τ. The modulation frequency difference is a frequency f0 of an intermediate frequency signal IFS obtained by the frequency modulated continuous wave demodulation circuit 123 coupling the chirp signal CH and the reflected signal RS. When the distance between the radar apparatus 100 and the target 200 is d, the delay τ may be expressed as 2d/C, and the frequency f0 and a phase $\phi_0$ of the intermediate frequency signal IFS are calculated by the following Equations (1) and (2):

$$f0 = f1 - f2 = S\tau = 2Sd/C \qquad \text{Equation (1)}$$

$$\phi_0 = 4\pi d/\lambda \qquad \text{Equation (2)}$$

Where C is the speed of light and λ is the wavelength corresponding to an electromagnetic wave frequency of the radio frequency signal TS.

It can be seen from Equations (1) and (2) that when the distance d between the radar apparatus 100 and the target 200 is smaller, the delay τ between the radio frequency signal TS and the reflected signal RS is smaller, so the frequency difference, also referred to as the beat frequency, between the radio frequency signal TS and reflection signal RS, that is, the frequency f0 of the intermediate frequency signal IFS is smaller. When the distance d between the radar apparatus 100 and the target 200 is greater, the delay τ is also greater, so the frequency difference between the radio frequency signal TS and the reflected signal RS, that is, the frequency f0 of the intermediate frequency signal IFS is greater. In other words, the main frequency of the reflected signal RS is the same as the radio frequency signal TS, and the frequency f0 of the intermediate frequency signal IFS is generated by coupling the distance d between the radar apparatus 100 and the target 200.

Return to the radar apparatus 100 of FIG. 3 again. The analog-to-digital converter 121 may convert the intermediate frequency signal IFS into digital data. After the digital data is computed by the processor 130, information associated with the target 200, such as the distance of the object, the speed, or the vital signs of breathing and heartbeat, may be obtained.

The processor 130 (also referred to as a computational processor) may be a chip, a processor, a microcontroller, an application-specific integrated circuit (ASIC), or any type of digital circuit. The processor 130 may compute the digital data converted from the intermediate frequency signal IFS. The processor 130 may use various digital signal processing algorithms to remove the noise of the digital data, remove the high-frequency signal of the digital data, and compute the target 200 to be detected according to the digital data, such as the distance of the object, the direction angle of the object, or the speed of the object. In an embodiment, the target 200 may be a human body. The processor 130 may use the digital data converted from the intermediate frequency signal IFS to compute the vital signs of breathing and heartbeat of the human body.

Figure 6:
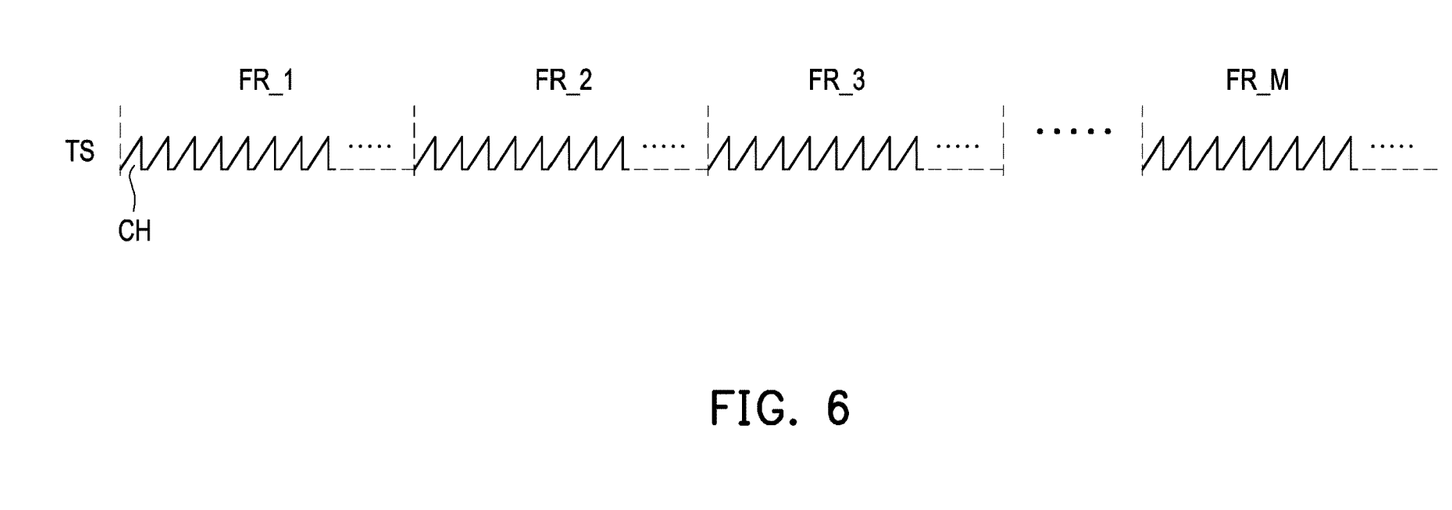
FIG. 6 is a schematic diagram of multiple frames of a radio frequency signal according to an embodiment of the disclosure.

FIG. 6 is a schematic diagram of multiple frames of a radio frequency signal according to an embodiment of the disclosure. The radio frequency signal TS emitted by the radar apparatus 100 includes multiple frames FR_1, FR_2, . . . , FR_M. Each frame is the basic time length for the radar apparatus 100 to detect whether there is the target 200 in the field ENV. Each of the frames FR_1, FR_2, . . . , FR_M may include at least one chirp signal CH (also referred to as the detection signal). In the normal working mode, the frames FR 1, FR 2, . . . , FR_M may include multiple chirp signals CH. Each of the frames FR 1, FR 2, . . . , FR_M may include at most n chirp signals CH, where n is an integer. For example, in an embodiment, the frame FR_1 may have at most n=64 chirp signals CH. In an embodiment, the frames FR_1, FR_2, . . . , FR_M have different numbers of chirp signals CH. In an embodiment, the number of chirp signals CH that each of the frames FR_1, FR_2, . . . , FR_M has may be adjusted according to the resolution required by the detection work of the radar apparatus 100.

Figure 7:
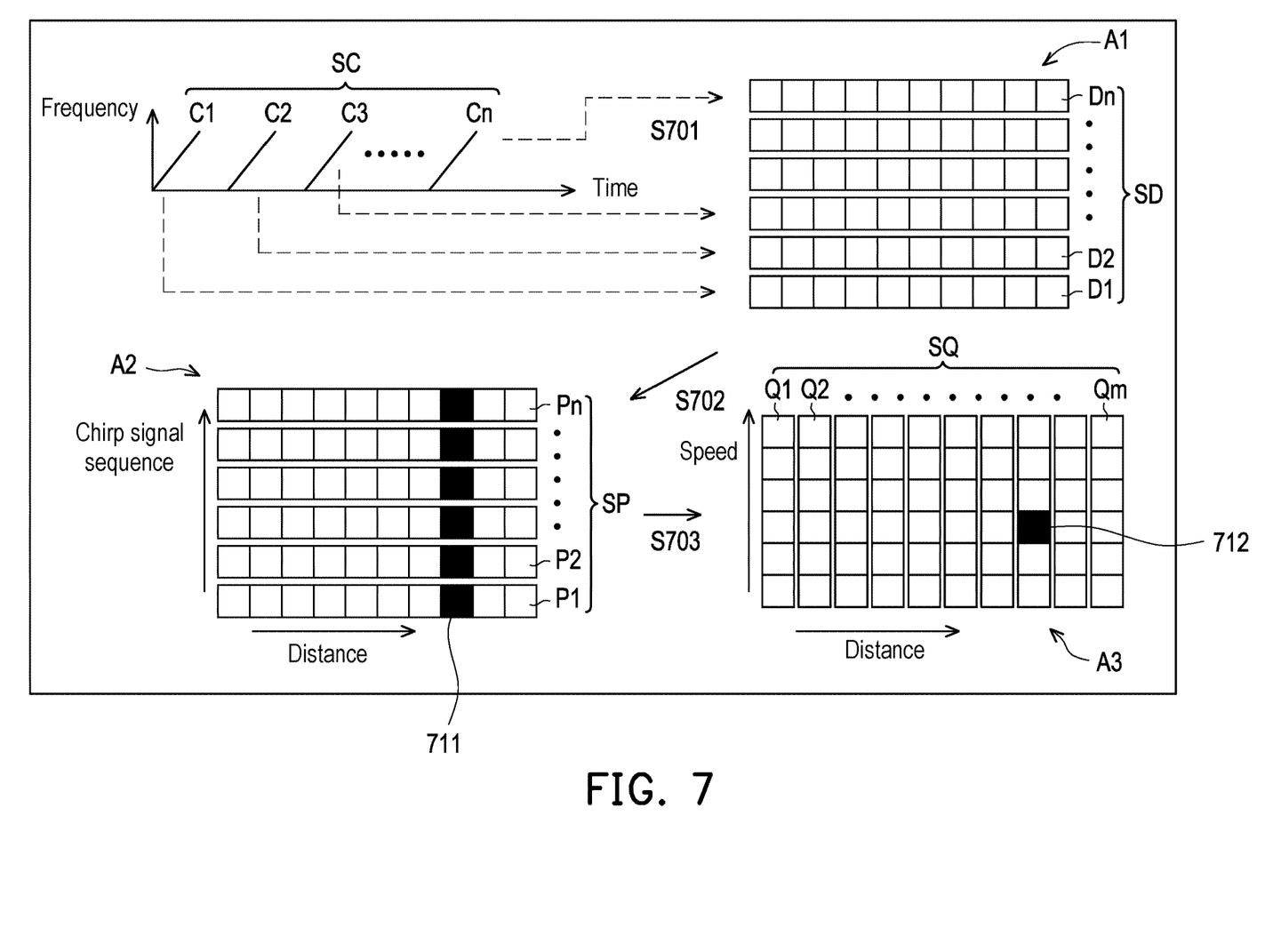
FIG. 7 is a schematic diagram of detecting a target in a field according to a reflected signal according to an embodiment of the disclosure.

FIG. 7 is a schematic diagram of detecting a target in a field according to a reflected signal according to an embodiment of the disclosure. Please refer to FIG. 7. An intermediate frequency signal SC obtained by the frequency modulated continuous wave demodulation circuit 123 demodulating the reflected signal RS includes parts corresponding to multiple chirp signals C1, C2, C3, . . . , Cn.

In Step S701, the intermediate frequency signal SC is converted by the analog-to-digital converter 121 into multiple digital data SD stored as an A1 matrix. The multiple digital data SD include multiple sets of arrays D1, D2, . . . , Dn, and the arrays D1, D2, . . . , Dn respectively correspond to the chirp signals C1, C2, C3, . . . , Cn. The horizontal axis of the A1 matrix is the sampling time unit of each chirp signal. The vertical axis of the A1 matrix is the arrangement sequence of the arrays D1, D2, . . . , Dn from bottom to top respectively corresponding to the chirp signals C1, C2, C3, . . . , Cn.

In Step S702, the processor 130 may perform fast Fourier transform (FFT) on the arrays D1, D2, . . . , Dn stored in the A1 matrix to obtain multiple digital data SP of an A2 matrix, that is, perform FFT, also referred to as range FFT, along the horizontal axis of the A1 matrix. After the A1 matrix undergoes the range FFT computation, the A2 matrix may be obtained. The multiple digital data SP of the A2 matrix include arrays P1, P2, . . . , Pn, which respectively correspond to the arrays D1, D2, . . . , Dn in the A1 matrix. The horizontal axis in the A2 matrix is frequency information, also referred to as a distance frequency. The frequency information may be converted into range information using Equations (1) and (2). The range information may be used to correspond to a detection situation located at a certain distance. Therefore, the frequency information on the horizontal axis in the A2 matrix may also be referred to as the distance frequency. Specifically, a value of each point in the A2 matrix is an amplitude value corresponding to multiple distance frequencies obtained by the range FFT computation. The magnitude of the amplitude value represents the signal strength of the reflected signal RS at the distance corresponding to that point. The greater the amplitude value of a distance frequency on the horizontal axis in the A2 matrix, the greater the signal strength at the distance corresponding to the distance frequency, which represents that the target 200 is detected at the position. When the amplitude value of a distance frequency in the A2 matrix is very small, the signal strength at the distance corresponding to the point is also very small, which represents that the target 200 is not detected at the position.

In an embodiment, in response to an amplitude value of a distance frequency in the A2 matrix being greater than a first threshold value, the processor 130 may judge that the target 200 is detected in the field ENV. The first threshold value may be determined via field measurement. Specifically, as shown in FIG. 7, the amplitude value of the distance frequency corresponding to a data point 711 of the array P1 in the A2 matrix is greater than the first threshold value. The processor 130 judges that the target 200 is detected in the field ENV.

In Step S703, the processor 130 may perform FFT on each vertical axis of the A2 matrix to obtain multiple digital data SQ. The computation is also referred to as Doppler FFT. After performing Doppler FFT on the A2 matrix, multiple Doppler frequencies may be obtained. Specifically, after the A2 matrix undergoes Doppler FFT, the multiple digital data SQ of an A3 matrix are obtained and include multiple sets of arrays Q1, Q2, . . . , Qm corresponding to digital data, that is, a Doppler frequency, on each vertical axis of the A3 matrix. The arrays Q1, Q2, . . . , Qm include phase change information of the intermediate frequency signal SC. The horizontal axis of the A3 matrix and the A2 matrix also represent the distance. The Doppler frequency on the vertical axis of the A3 matrix may be used to detect the phase change information, such as the speed of object movement, the frequency of periodic movement, or the vital signs such as breathing and heartbeat, of the target 200 at a certain distance. Each data point in the A3 matrix is an amplitude value, and the amplitude value corresponds to a distance frequency on the horizontal axis and a Doppler frequency on the vertical axis. The greater the amplitude value of the distance frequency and the Doppler frequency corresponding to a data point in the A3 matrix, the greater the signal strength of the data point, which represents that the target 200 located at the distance corresponding to the distance frequency and moving at the speed corresponding to the Doppler frequency is detected. When an amplitude value of the distance frequency and the Doppler frequency corresponding to a data point in the A3 matrix are very small, the signal strength of the data point is also very small, which represents that the target 200 located at the distance and moving at the speed corresponding to the Doppler frequency is not detected.

In an embodiment, in response to an amplitude value of a Doppler frequency in the A3 matrix being greater than a second threshold value, the processor 130 may judge that the target 200 is detected in the field ENV. The second threshold value may be determined by field measurement. Specifically, as shown in FIG. 7, when the amplitude value of the Doppler frequency corresponding to a data point 712 in the A3 matrix is greater than the second threshold value, the processor 130 judges that the target 200 is detected in the field ENV. The processor 130 may judge that the target 200 is moving at the speed corresponding to the Doppler frequency of the data point 712 on the vertical axis of the A3 matrix at the distance corresponding to the distance frequency of the data point 712 on the horizontal axis of the A3 matrix.

Figure 8:
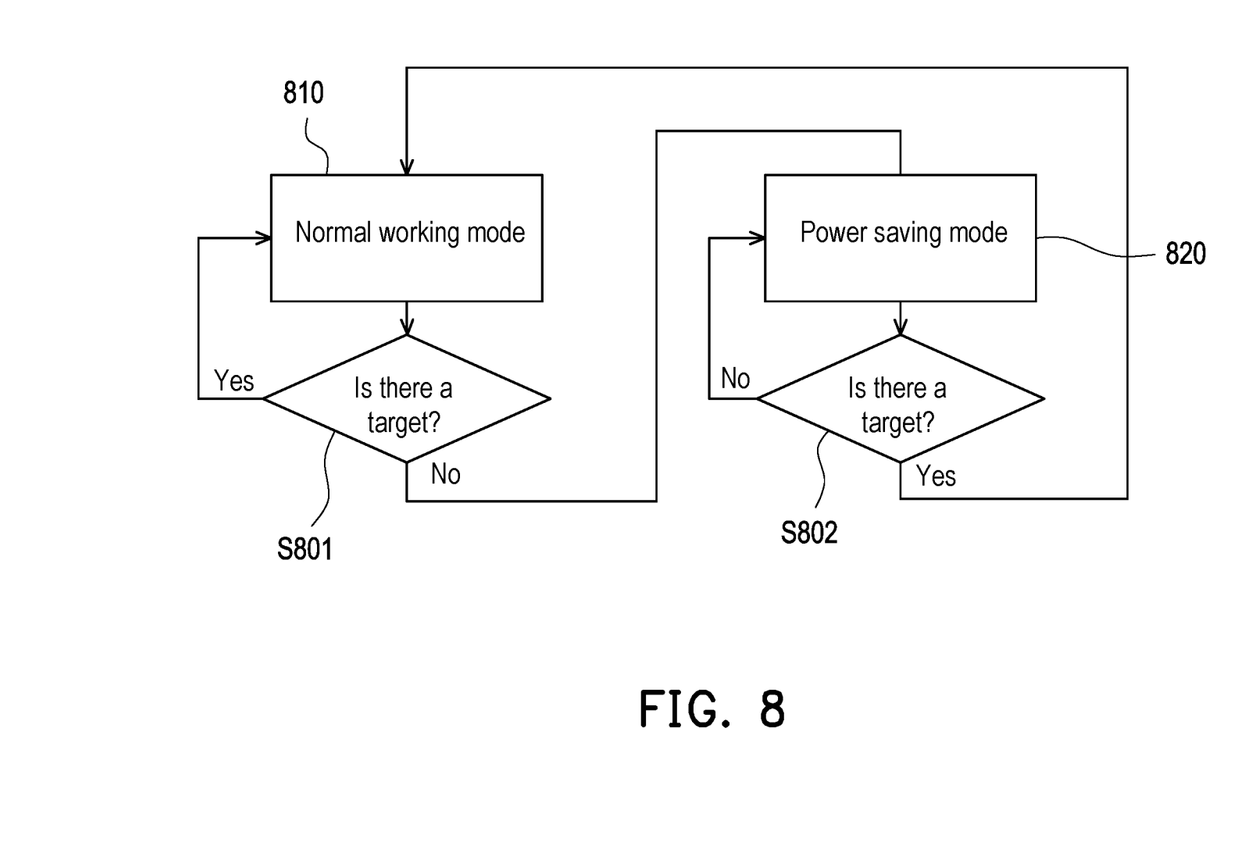
FIG. 8 is a flowchart of an operation of a radar apparatus according to an embodiment of the disclosure.

FIG. 8 is a flowchart of an operation of a radar apparatus according to an embodiment of the disclosure. Please refer to FIG. 8. The radar apparatus 100 executes Step S801 in a normal working mode 810. In Step S801, the radar apparatus 100 detects whether there is the target 200 (for example, an object) in the field ENV. When the target 200 is detected in the field ENV, the radar apparatus 100 maintains the operation in the normal working mode 810. When the target 200 is not detected in the field ENV, the radar apparatus 100 enters a power saving mode 820. The radar apparatus 100 executes Step S802 in the power saving mode 820. In Step S802, the radar apparatus 100 detects whether there is the target 200 in the field ENV. When the target 200 is detected in the field ENV, the radar apparatus 100 restores from the power saving mode 820 to the normal working mode 810. When the target 200 is not detected in the field ENV, the radar apparatus 100 maintains the workload operation in the power saving mode 820.

In other words, the radar apparatus 100 continuously detects whether there is the target 200 in the field ENV in the normal working mode 810. The circuit operation of the transmitter 110 and the receiver 120 continues to consume power, and the processor 130 also continues to consume power when performing FFT to calculate the position of the object, the distance, the speed, other movements, or vital signs. When the radar apparatus 100 is in the power saving mode 820, the objective is not to detect and accurately calculate the position and the speed, but to reduce power consumption. Therefore, the radar apparatus 100 only needs to detect whether there is the target 200 in the field ENV. The power saving mode 820 is a detection mode with lighter load, and the radar apparatus 100 slightly slows down the detection workload. If there is no target 200 in the field ENV, the radar apparatus 100 switches to the power saving mode 820 to reduce the workload of the transmitter 110, the receiver 120, or the processor 130, so as to save power consumption.

Figure 9:
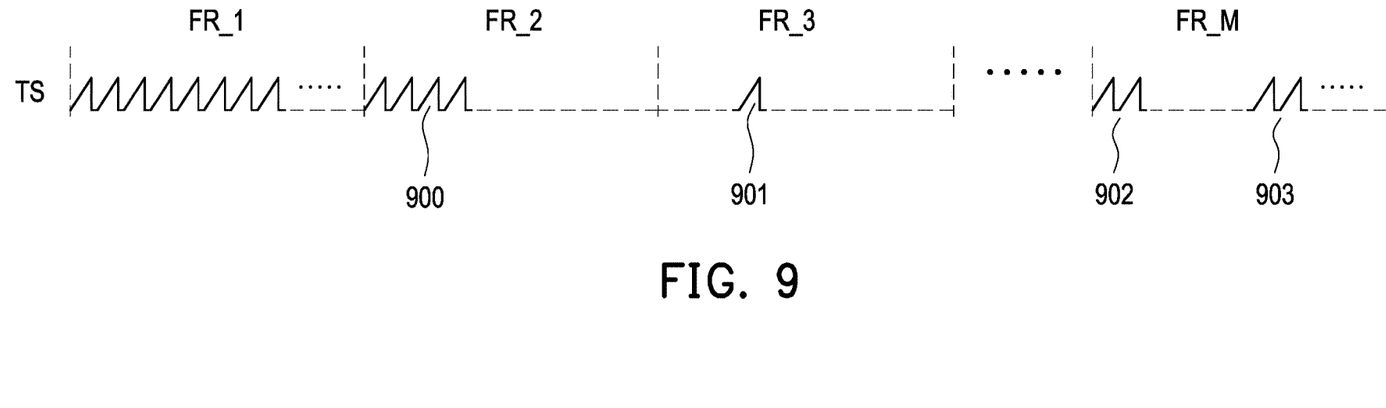
FIG. 9 is a schematic diagram of detection signals of multiple frames in a power saving mode according to an embodiment of the disclosure.

FIG. 9 is a schematic diagram of detection signals of multiple frames in a power saving mode according to an embodiment of the disclosure. The radio frequency signal TS includes multiple frames FR_1, FR_2, FR_3, . . . , FR_M. When the target 200 is not detected in the frame FR_1, the radar apparatus 100 enters the power saving mode 820. At this time, the radar apparatus 100 reduces the number of detection signals (or chirp signals) of the frame FR_2 while correspondingly reducing the workload of the transmitter 110, the receiver 120, or the processor 130.

For example, the frame FR_1 in the normal working mode 810 has 64 detection signals. When in the power saving mode 820, the number of detection signals of the frames FR_2, FR_3, . . . , FR_M may be reduced. For example, the number of detection signals may be reduced to 32, 16, 8, 4, 2, or 1, which may also be other numbers. The number of a part of the detection signals may be continuous, discontinuous, or partly continuous and partly discontinuous. For example, in FIG. 9, detection signals 900 of the frame FR_2 are reduced to 4. For another example, there may be only one detection signal 901 in the frame FR_3 or the frame FR_M may include partly spaced detection signals 902 and detection signals 903.

Figure 10:
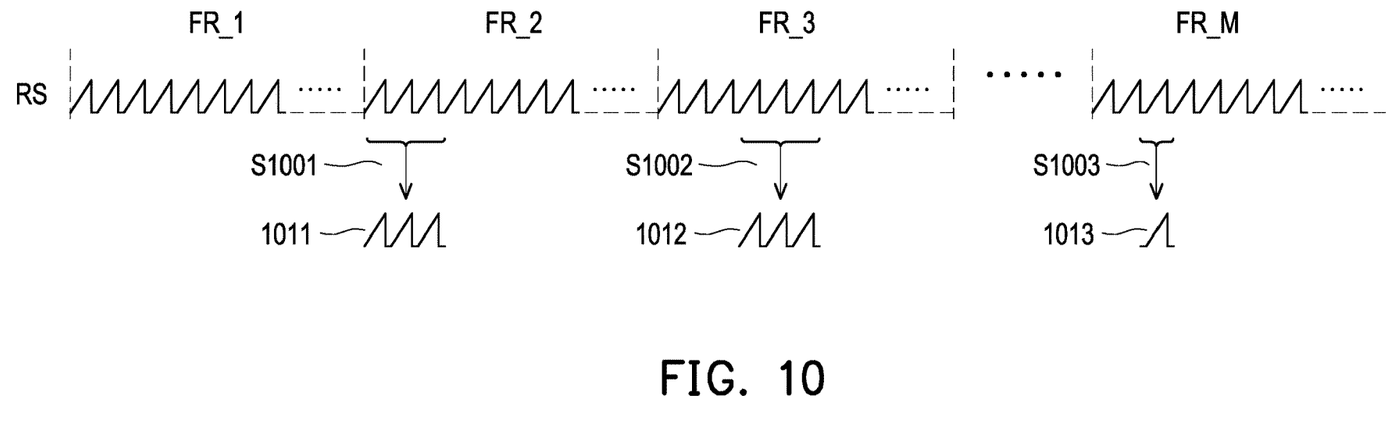
FIG. 10 is a schematic diagram of capturing detection signals from frames in a power saving mode according to an embodiment of the disclosure.

FIG. 10 is a schematic diagram of capturing detection signals from frames in a power saving mode according to an embodiment of the disclosure. In an embodiment, the processor 130 may only process the FFT computation of a part of the detection signals in the reflected signal RS to detect the target 200. For example, the reflected signal RS in FIG. 10 corresponds to multiple frames FR_1, FR_2, FR_3, . . . , FR_M, and the number of detection signals in the frames FR_1, FR_2, FR_3, . . . , FR_M is the same as the workload in the normal operation mode 810. For example, in Step S1001, the processor 130 may only capture detection signals 1011 in an initial part of the frame FR_2 for computation. For example, in Step S1002, the processor 130 may capture only a part of detection signals 1012 in the frame FR_3 for computation. The part of the detection signals may be continuous, discontinuous, or partly continuous and partly discontinuous. For example, in Step S1003, the processor 130 may only capture 1 detection signal 1013 in the frame FR_M for computation. The hardware work of the radar apparatus 100 has not changed, and only the program execution of the computation of the processor 130 is changed, so that the power consumed when processing computation can be saved, and the implementation is easier.

In some application scenarios, when the radar apparatus 100 does not detect the target 200 in the field ENV, within a period of time, even if the target 200 enters, the detection processing of the radar apparatus 100 is not affected. At this time, the radar apparatus 100 may reduce the workload for the period of time, and then restore to normal workload after waiting for the period of time.

Figure 11:
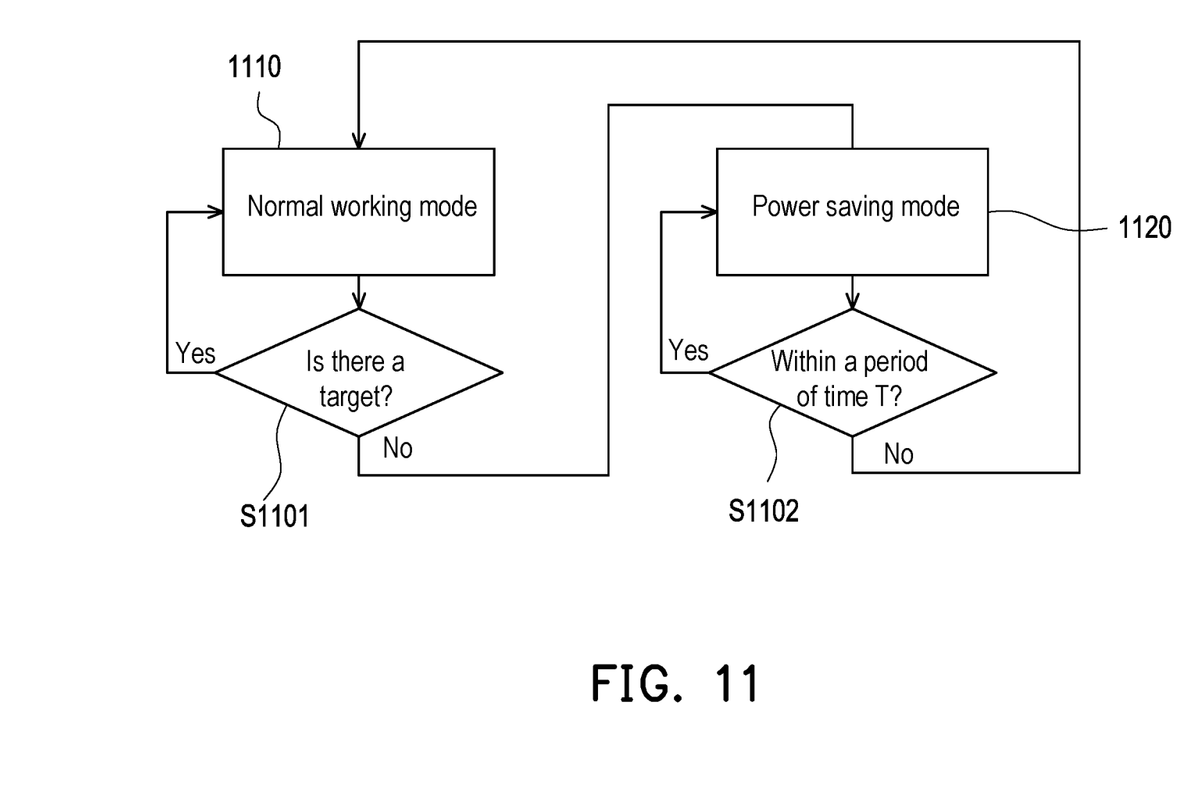
FIG. 11 is a flowchart of an operation of a radar apparatus according to another embodiment of the disclosure.

FIG. 11 is a flowchart of an operation of a radar apparatus according to another embodiment of the disclosure. The radar apparatus 100 executes Step S1101 in a normal working mode 1110. In Step S1101, the radar apparatus 100 detects whether there is the target 200 (for example, an object) in the field ENV. When the target 200 is detected in the field ENV, the radar apparatus 100 maintains the operation in the normal working mode 1110. When the target 200 is not detected in the field ENV, the radar apparatus 100 enters a power saving mode 1120. In the power saving mode 1120, the radar apparatus 100 executes Step S1102. In Step S1102, the radar apparatus 100 maintains in the power saving mode 1120 within a period of waiting time T. After the period of waiting time T, the radar apparatus 100 restores to the normal working mode 1110. The power saving mode 1120 may reduce the workload in the same manner as the power saving mode 820.

Figure 12:
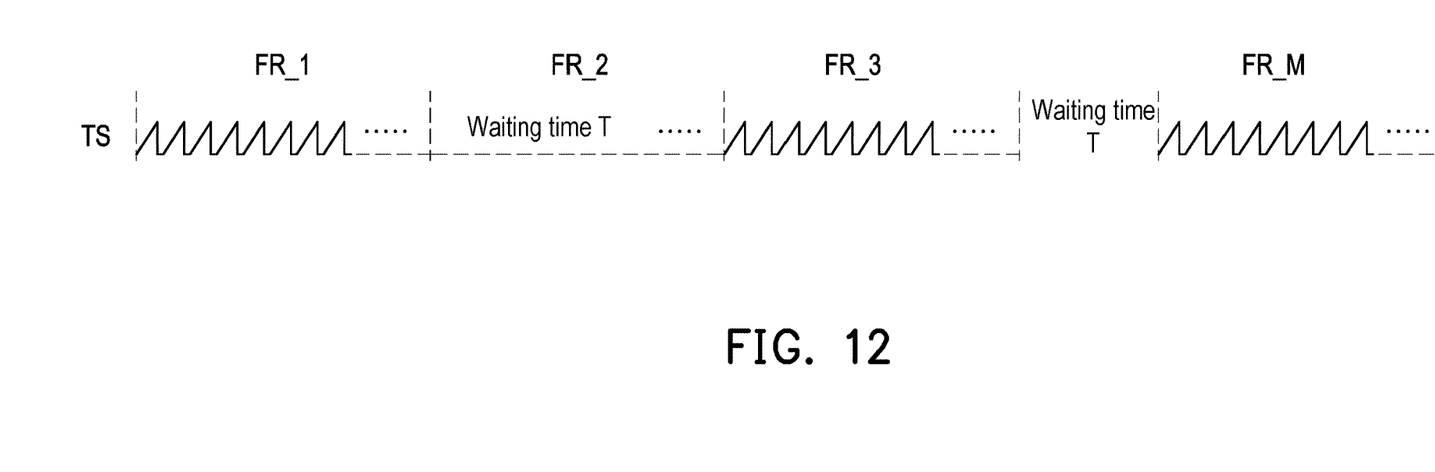
FIG. 12 is a schematic diagram of multiple frames in a power saving mode according to another embodiment of the disclosure.

FIG. 12 is a schematic diagram of multiple frames in a power saving mode according to another embodiment of the disclosure. In an embodiment, when the radar apparatus 100 enters the power saving mode 1120, the radar apparatus 100 stops transmitting the radio frequency signal TS within the waiting time T. The waiting time T may be the time of one frame or the time of several frames, which may be adjusted according to the requirements of application. For example, within the time of one frame of the frame FR_2, the radar apparatus 100 stops transmitting the radio frequency signal TS. Alternatively, within the time of multiple frames between the frame FR_3 and the frame FR_M, the radar apparatus 100 stops transmitting the radio frequency signal TS.

Figure 13:
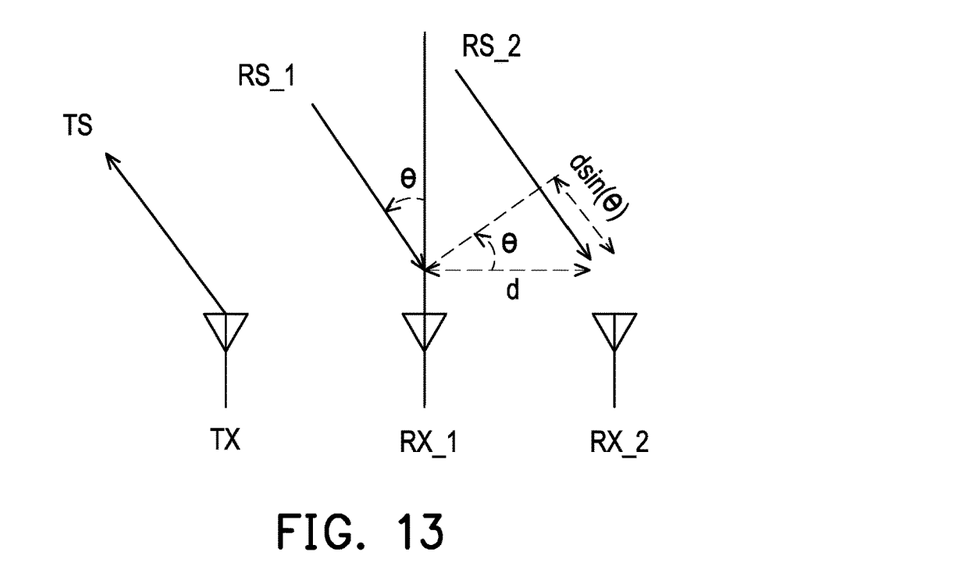
FIG. 13 is a schematic diagram of estimating an angle of arrival according to an embodiment of the disclosure.

FIG. 13 is a schematic diagram of estimating an angle of arrival according to an embodiment of the disclosure. Since range FFT can only detect the distance of the position where the object to be detected is located, but does not know the direction thereof, in order to detect the direction thereof, more than one reception antenna is required. In an embodiment, the radar apparatus 100 may include an emission antenna TX, a reception antenna RX_1, and a reception antenna RX_2. After the radio frequency signal TS transmitted by the emission antenna TX is reflected by the object, the reception antenna RX_1 receives a reflected signal RS_1, and the reception antenna RX_2 receives a reflected signal RS_2. Since the distances between the object to be detected and the two antennas are different, the time taken for the reflected signals RS_1 and RS_2 to reach the two antennas RS_1 and RS_2 are also different. Therefore, there is a phase difference co between the two reflected signals RS_1 and RS_2. When the distance between the reception antennas RS_1 and RS_2 is d, an angle θ at which the reflected signals RS_1 and RS_2 reach the reception antennas RS_1 and RS_2 may be calculated by the following Equation (3).

$$\theta = \sin^{-1}\left(\frac{\lambda\omega}{2\pi d}\right) \quad \text{Equation (3)}$$

Where λ is the wavelength corresponding to the electromagnetic wave frequency of the radio frequency signal TS.

After expanding the two reception antennas to multiple reception antennas, the directions of the positions where multiple objects are located may be accurately detected.

Figure 14:
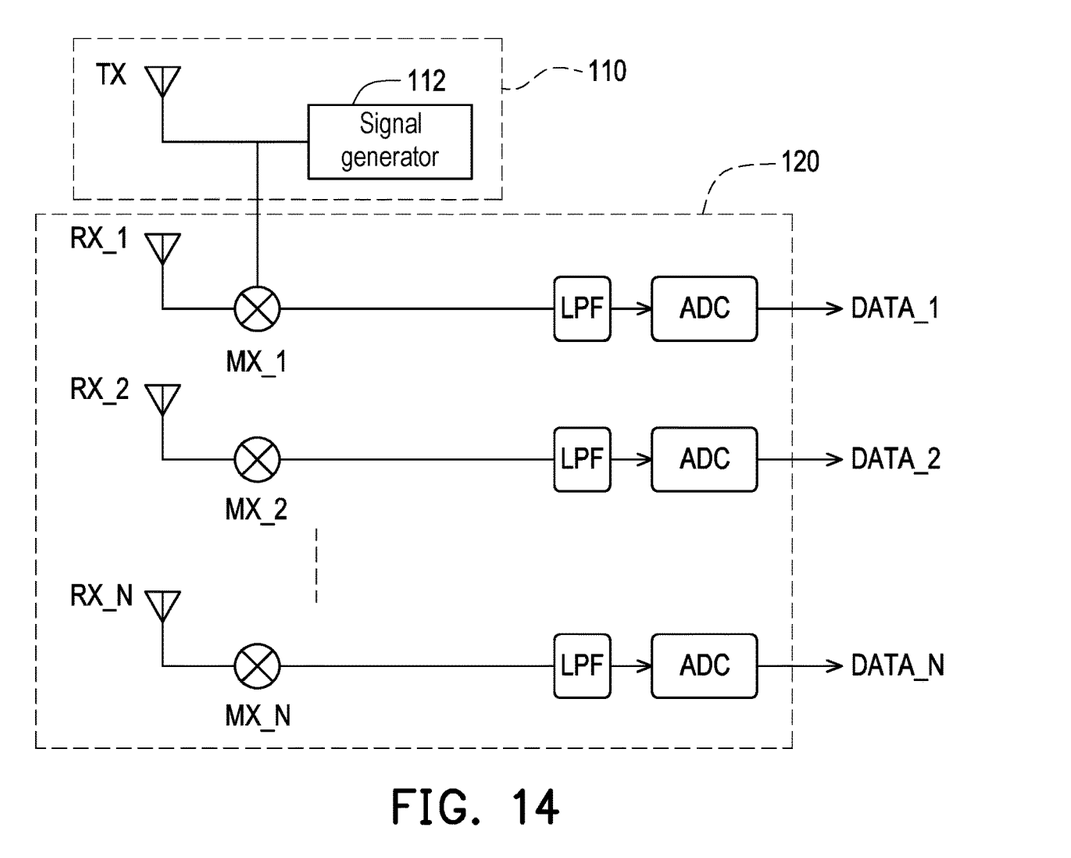
FIG. 14 is a schematic diagram of a radar apparatus according to a third embodiment of the disclosure.

FIG. 14 is a schematic diagram of a radar apparatus according to a third embodiment of the disclosure. The receiver 120 may include multiple reception antennas RX_1, RX_2, . . . , RX_N, multiple mixers MX_1, MX_2, . . . , MX_N, multiple low-pass filters LPF, and multiple analog-to-digital converters ADC. The reception antenna RX_1, RX_2, . . . , RX_N respectively receive signals reflected by the object to be detected, which are coupled with the radio frequency signal generated by the signal generator 112 through the mixers MX_1, MX_2, . . . , MX_N, and are converted into multiple digital data DATA_1, DATA_2, . . . , DATA N through the low-pass filters LPF and the analog-to-digital converters ADC. After the digital data DATA_1, DATA_2, . . . , DATA N undergo FFT computation, the directions of the positions where multiple objects are located may be estimated. Alternatively, an angle of arrival estimation algorithm, such as multiple signal classification algorithm (MUSIC), may be used to obtain the angle of arrival with higher resolution.

In summary, in the Doppler radar apparatus and the power saving method provided by the embodiments of the disclosure, when there is no target in the field, the radar apparatus enters the power saving working mode to reduce the workload and maintains detection at low power consumption. When the target is detected in the field, the radar apparatus restores to the normal working mode. In this way, power consumption can be saved.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A Doppler radar apparatus, comprising:
a transmitter, transmitting a radio frequency signal to a field, wherein the radio frequency signal includes a plurality of frames;
a receiver, coupled to the transmitter and receiving a reflected signal corresponding to the radio frequency signal from the field; and
a processor, coupled to the receiver and configured to:
detect a target in the field according to the reflected signal;
switch from a normal working mode to a power saving mode according to workload reduction information in response to the target not being detected in the field, the workload reduction information includes a total number of frames corresponding to the radio frequency signal and a number of detection signals emitted in each of the frames, wherein
workload of the radio frequency signal in the power saving mode decreases based on the workload reduction information,
adjust the frequency of the radio frequency signal according to workload reduction information during the power saving mode; and
instruct the transmitter to stop transmitting the radio frequency signal within the waiting time after switching from the normal working mode to the power saving mode.

2. The Doppler radar apparatus according to claim 1, wherein:
the radio frequency signal comprises the plurality of frames,
a first frame of the frames comprises a plurality of first detection signals, a second frame of the frames comprises a plurality of second detection signals, and
a number of the second detection signals is less than a number of the first detection signals after switching to the power saving mode.

3. The Doppler radar apparatus according to claim 1, wherein the radio frequency signal comprises the plurality of frames, and a third frame of the frames comprises a plurality of third detection signals, wherein the processor is further configured to:
capture a fourth detection signal from the third detection signals, and detect the target in the field according to the fourth detection signal.

4. The Doppler radar apparatus according to claim 1, wherein the radio frequency signal comprises the plurality of frames, wherein the processor is further configured to:
adjust a number of the frames according to the workload reduction information.

5. The Doppler radar apparatus according to claim 1, wherein the radio frequency signal comprises the plurality of frames, wherein the processor is further configured to:
switch from the power saving mode to the normal working mode in response to the target being detected in the field, and restore the workload of the frames in the normal working mode.

6. The Doppler radar apparatus according to claim 1, wherein the transmitter comprises:
a signal generator, generating a chirp signal according to a sweep cycle, wherein a frequency of the chirp signal changes with time within the sweep cycle, wherein the radio frequency signal comprises the plurality of frames, and at least one of the frames comprises the chirp signal.

7. The Doppler radar apparatus according to claim 6, wherein the receiver comprises:
a frequency modulated continuous wave demodulation circuit, coupled to the signal generator and demodulating the reflected signal according to the chirp signal to obtain an intermediate frequency signal; and an analog-to-digital converter, coupled to the frequency modulated continuous wave demodulation circuit and converting the intermediate frequency signal into digital data.

8. The Doppler radar apparatus according to claim 7, wherein the detection of the target in the field according to the reflected signal comprises:

performing range fast Fourier transform (FFT) on the digital data to obtain at least one distance frequency; and judging that the target is detected in the field in response to an amplitude value of the at least one distance frequency being greater than a first threshold value.

9. The Doppler radar apparatus according to claim 7, wherein the detection of the target in the field according to the reflected signal comprises:

performing range FFT and Doppler FFT on the digital data to obtain at least one Doppler frequency; and judging that the target is detected in the field in response to an amplitude value of the at least one Doppler frequency being greater than a second threshold value.

10. The Doppler radar apparatus according to claim 6, wherein the transmitter further comprises:

a frequency modulated continuous wave emission circuit, coupled to the signal generator and amplifying the chirp signal to generate the radio frequency signal; and an emission antenna, coupled to the frequency modulated continuous wave emission circuit and emitting the radio frequency signal.

11. A power saving method, applicable to a Doppler radar apparatus, the power saving method comprising:

detecting a target in the field according to a reflected signal;

switching from a normal working mode to a power saving mode according to workload reduction information in response to the target not being detected in the field, the workload reduction information includes a total number of frames corresponding to the radio frequency signal and a number of detection signals emitted in each of the frames, wherein workload of the radio frequency signal in the power saving mode decreases based on the workload reduction information, adjust the frequency of the radio frequency signal according to workload reduction information during the power saving mode; and instructing the transmitter to stop transmitting the radio frequency signal within the waiting time after switching from the normal working mode to the power saving mode.

12. The power saving method according to claim 11, further comprising:

transmitting the radio frequency signal to a field, wherein the radio frequency signal includes a plurality of frames; and receiving the reflected signal corresponding to the radio frequency signal from the field.

13. The power saving method according to claim 12, wherein the radio frequency signal comprises the plurality of frames, a first frame of the frames comprises a plurality of first detection signals, a second frame of the frames comprises a plurality of second detection signals, and a number of the second detection signals is less than or equal to a number of the first detection signals after switching to the power saving mode.

14. The power saving method according to claim 12, wherein the radio frequency signal comprises the plurality of frames, and a third frame of the frames comprises a plurality of third detection signals, the power saving method further comprising:

capturing a fourth detection signal from the third detection signals, and detecting the target in the field according to the fourth detection signal.

15. The power saving method according to claim 12, wherein the radio frequency signal comprises the plurality of frames, the power saving method further comprising:

adjusting a number of the frames according to the workload reduction information.

16. The power saving method according to claim 12, wherein the radio frequency signal comprises the plurality of frames, the power saving method further comprising:

switching from the power saving mode to the normal working mode in response to the target being detected in the field, and restoring the workload of the frames in the normal working mode.

17. The power saving method according to claim 12, further comprising:

generating a chirp signal according to a sweep cycle, wherein a frequency of the chirp signal changes with time within the sweep cycle, wherein the radio frequency signal comprises the plurality of frames, and at least one of the frames comprises the chirp signal;

demodulating the reflected signal according to the chirp signal to obtain an intermediate frequency signal; and converting the intermediate frequency signal into digital data.

18. The power saving method according to claim 17, wherein the step of detecting the target in the field according to the reflected signal comprises:

performing range FFT on the digital data to obtain at least one distance frequency; and judging that the target is detected in the field in response to an amplitude value of the at least one distance frequency being greater than a first threshold value.

19. The power saving method according to claim 17, wherein the step of detecting the target in the field according to the reflected signal comprises:

performing range FFT and Doppler FFT on the digital data to obtain at least one Doppler frequency; and judging that the target is detected in the field in response to an amplitude value of the at least one Doppler frequency being greater than a second threshold value.

* * * * *